US012792985B2

(12) United States Patent
Schaad et al.

(10) Patent No.: US 12,792,985 B2
(45) Date of Patent: Nov. 10, 2026

(54) WORKSPACE CALENDAR INTEGRATION

(71) Applicant: Notion Labs, Inc., San Francisco, CA (US)

(72) Inventors: Raphael Schaad, San Francisco, CA (US); Michael Johnston, San Francisco, CA (US); Joseph Antonakakis, San Francisco, CA (US); James Zhang, San Francisco, CA (US)

(73) Assignee: Notion Labs, Inc.

( * ) Notice: Subject to any disclaimer, the term of this patent is extended or adjusted under 35 U.S.C. 154(b) by 65 days.

(21) Appl. No.: 18/583,623

(22) Filed: Feb. 21, 2024

(65) Prior Publication Data

US 2025/0245586 A1 Jul. 31, 2025

Related U.S. Application Data

(60) Provisional application No. 63/625,189, filed on Jan. 25, 2024.

(51) Int. Cl.
*G06Q 10/0631* (2023.01)
*G06Q 10/109* (2023.01)

(52) U.S. Cl.
CPC ................ *G06Q 10/06312* (2013.01); *G06Q 10/063118* (2013.01); *G06Q 10/1097* (2013.01)

(58) Field of Classification Search
CPC ..... G06Q 10/06312; G06Q 10/063118; G06Q 10/1097
See application file for complete search history.

(56) References Cited

U.S. PATENT DOCUMENTS 10,540,641 B2 * 1/2020 Chan .................. G06Q 20/3829
11,941,560 B2 * 3/2024 Khanna ............ G06Q 10/06313
(Continued)

FOREIGN PATENT DOCUMENTS

WO WO 2002021413 A2 * 9/2001
WO WO-2022212370 A2 * 10/2022 ............. G06F 16/93

OTHER PUBLICATIONS

K. Singh and V. Krishnaswamy, "Private overlay of enterprise social data and interactions in the public web context," 9th IEEE International Conference on Collaborative Computing: Networking, Applications and Worksharing, Austin, TX, USA, 2013, pp. 295-304, (Year: 2013).*

(Continued)

*Primary Examiner* — Jerry O'Connor
*Assistant Examiner* — Jeremy L Gunn
(74) *Attorney, Agent, or Firm* — Dorsey & Whitney LLP; Lena Petrovic; Anni Siitonen

(57) ABSTRACT

Methods and devices for providing users with an integrated calendar tool that is capable of centrally managing personal calendars, work calendar(s), and tasks for team projects at the same time. In one example aspect, a computer-implemented method for integrating project information in a calendar view of a workspace method includes determining information associated with a project that is represented as a plurality of blocks (or content containers) in the workspace. Each of the plurality of blocks is embedded as an in-page object on a page of the workspace. At least part of the plurality of blocks includes one or more time properties. The method includes displaying, in a calendar page of a user who participates in the project, the at least part of the plurality of blocks according to the one or more time properties.

20 Claims, 18 Drawing Sheets

(56) References Cited

U.S. PATENT DOCUMENTS

| | | | | |
|---|---|---|---|---|
| 12,541,295 | B2 * | 2/2026 | Kittur | G06F 3/0486 |
| 2017/0046964 | A1 * | 2/2017 | Karpoff | G06Q 10/06 |
| 2018/0176318 | A1 | 6/2018 | Rathod | |
| 2018/0189744 | A1 * | 7/2018 | Frank | G06Q 10/1093 |
| 2021/0342361 | A1 * | 11/2021 | Radzewsky | G06F 40/18 |
| 2022/0382961 | A1 * | 12/2022 | Schmidtke | G06F 16/93 |
| 2022/0391852 | A1 * | 12/2022 | Stevens | G06Q 10/1097 |
| 2023/0334393 | A1 * | 10/2023 | Seifert | G06Q 50/08 |
| 2023/0368150 | A1 * | 11/2023 | Drazic | G06Q 10/1093 |
| 2024/0020756 | A1 * | 1/2024 | Wayne | G06Q 10/06311 |

OTHER PUBLICATIONS

P. Fraternali and S. L. Herrera Gonzalez, "Model Driven Development of Gamified Applications," in Journal of Web Engineering, vol. 18, No. 7, pp. 655-694, Nov. 2019 (Year: 2019).*

International Search Report and Written Opinion dated Sep. 18, 2024 cited in PCT/2024/035914, 12 pages.

* cited by examiner

Projects Completed Table Filter Sort

| Project | Date | Description | Reporter | Status | Assignee |
|---|---|---|---|---|---|
| INFRA-1 | December 19, 202 | Feature 1 not working | | Completed | John Z |
| CALENDAR-1 | December 19, 202 | Icon appearance fix | | | Jose A |
| INFRA-1 | November 28, 202 | Feature 2 not working | | | Owl K |
| INFRA-2 | December 15, 202 | UI issues | | Completed | |
| CALENDAR-2 | December 15, 202 | Typo identified on UI | | | Mike J |
| INFRA-2 | December 18, 202 | Feature 3 not working | | In progress | Mike J |
| CALENDAR-1 | December 18, 202 | Feature 4 not working | | In progress | Mike J |

*FIG. 2B (Prior Art)*

WORKSPACE CALENDAR INTEGRATION

CROSS-REFERENCE TO RELATED APPLICATION

This patent document claims the benefit of priority to U.S. Provisional Patent Application No. 63/625,189, titled "WORKSPACE CALENDAR INTEGRATION," filed on Jan. 25, 2024. The contents of the above-noted application are incorporated herein by reference in its entirety.

BACKGROUND

Workspaces (e.g., digital workspaces) refer to environments that assemble tools and platforms that allow users to work, communicate, and produce work products together. Workspaces can be desktop or web-based applications that allow multiple users to share and access the workspaces in a variety of manners.

BRIEF DESCRIPTION OF THE DRAWINGS

Reference will now be made, by way of example, to the accompanying drawings, which show example embodiments of the present application and in which:

FIG. 2B shows an example user interface of a conventional tracking tool.

Figure 1A:
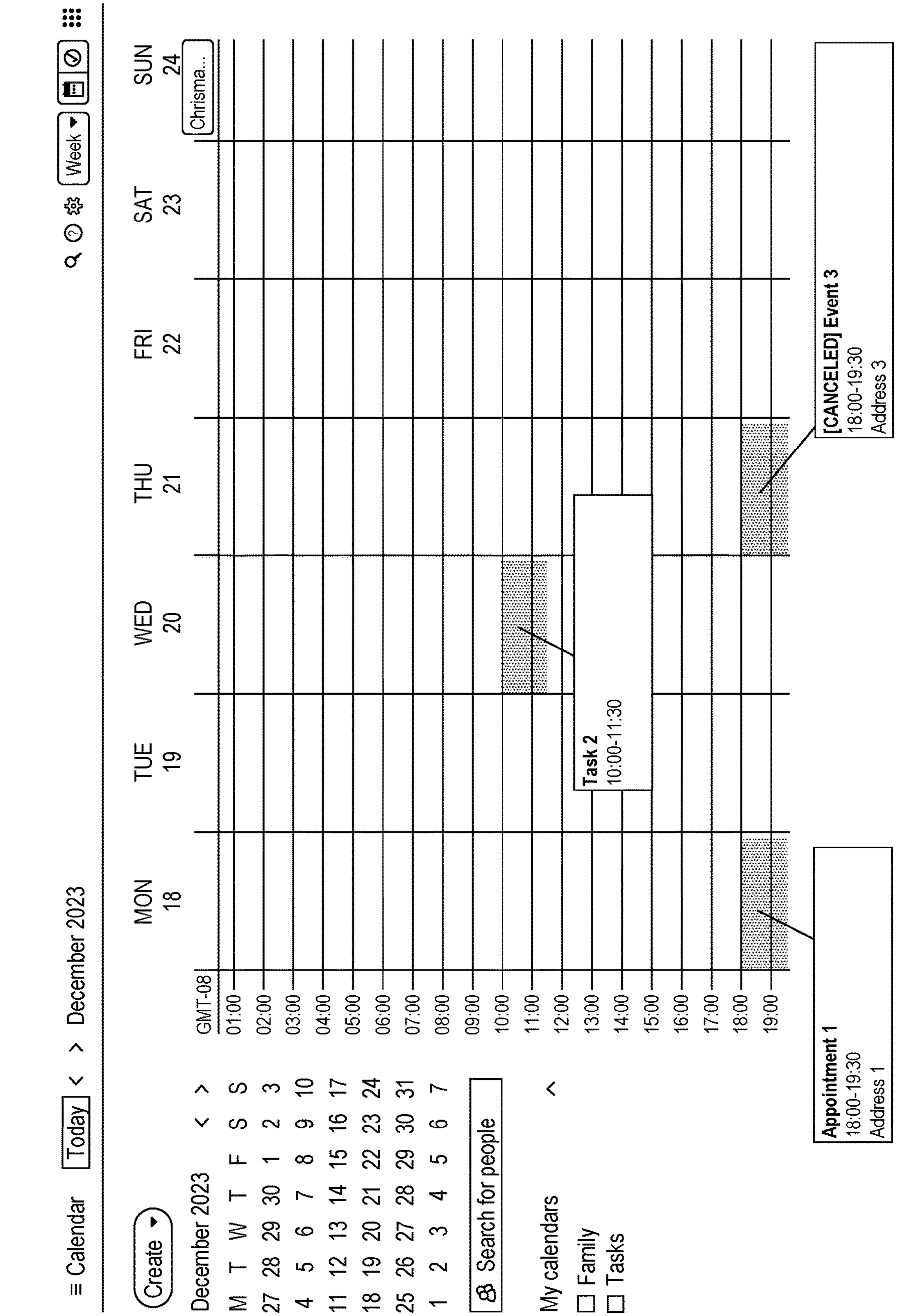
FIG. 1A (Prior Art)
FIG. 1A illustrates an example user interface of Google Calendar, showing appointments, events, and tasks on a user's schedule.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology provides methods and devices for enhanced workspace user experiences. An aspect of the technology provides a user with an integrated calendar tool that is capable of centrally managing personal calendars, work calendar(s), and tasks for team projects at the same time. Project information can be created and updated in the form of multiple in-page objects (also referred to as "blocks" or "content containers") and be displayed in different formats across different workspace pages, together with user-specific information. For example, project tasks can be created as rich-content entries in a table. A project timeline with relevant tasks can be automatically generated to facilitate project management. The project tasks can also be displayed on respective team members' calendars to enable task tracking and timely task completion. The present technology can be implemented in various embodiments to enable efficient management of project timelines and team schedules.

In one example, a computer-implemented method for integrating project information in a calendar view of a workspace method includes determining information associated with a project that is represented as a plurality of blocks (or content containers) in the workspace. Each of the plurality of blocks is embedded as an in-page object on a page of the workspace. At least part of the plurality of blocks includes one or more time properties (e.g., a start date, a due date, etc.). The method includes displaying, in a calendar page of a user who participates in the project, the at least part of the plurality of blocks according to the one or more time properties. The method includes receiving an input from the user via the calendar page. The input modifies content of a block in the at least part of the plurality of blocks.

In another example, a computer-implemented method for integrating project information in a calendar page of a user includes displaying user-specific information in the calendar page. The user-specific information comprises at least one of an event, an appointment, or a task created by the user (e.g., as seen in conventional calendar tools). The method includes determining part of project information that is associated with the user. The project information is represented as a plurality of blocks (or content containers). Each of the plurality of blocks is embedded as an in-page object on a page of a workspace of the user. The method includes displaying, in the calendar page of the user, the project information together with the user-specific information according to a user selection of a specific view. The specific view comprises at least one of (1) a due-date view in which a first part of the plurality of blocks that comprises a due-date property is displayed in the calendar page; and/or (2) a planned execution view in which a second part of the plurality of blocks that comprises a planned execution property is displayed in the calendar page. In some embodiments, some blocks include both the due-date property and the planned execution time property so that the first part of the plurality of blocks and the second part of the plurality of blocks have some common blocks.

In yet another example, a non-transitory, computer-readable storage medium comprising instructions recorded thereon is disclosed. The instructions, when executed by at least one data processor of a system, cause the system to perform operations for suggesting prompts on a page of a workspace. The operations include determining information associated with a project. The information is represented as a plurality of blocks (e.g., content containers). Each of the plurality of blocks is embedded as an in-page object on a page of the workspace. At least part of the plurality of blocks includes one or more time properties. The operations also include displaying, in a calendar page of a user who participates in the project, the at least part of the plurality of blocks according to the one or more time properties. In some embodiments, the operations include receiving an input from the user via the calendar page. The input modifies content of a block in the at least part of the plurality of blocks. The operation also includes automatically synchronizing the modified content of the block to the information associated with the project. In some embodiments, the operations comprise automatically synchronizing the calendar page upon a change to the information of the project.

Section headings are used in the present document only to improve readability and do not limit the scope of the disclosed embodiments and techniques in each section to only that section.

Overview

Calendar tools, such as Outlook Calendar and Google Calendar, are helpful tools that help people stay organized, stay on schedule, and save time. People often use a calendar tool to indicate important dates, manage appointments, and track tasks. FIG. 1A illustrates an example user interface of Google Calendar, showing appointments, events, and tasks on a user's schedule.

Figure 1B:
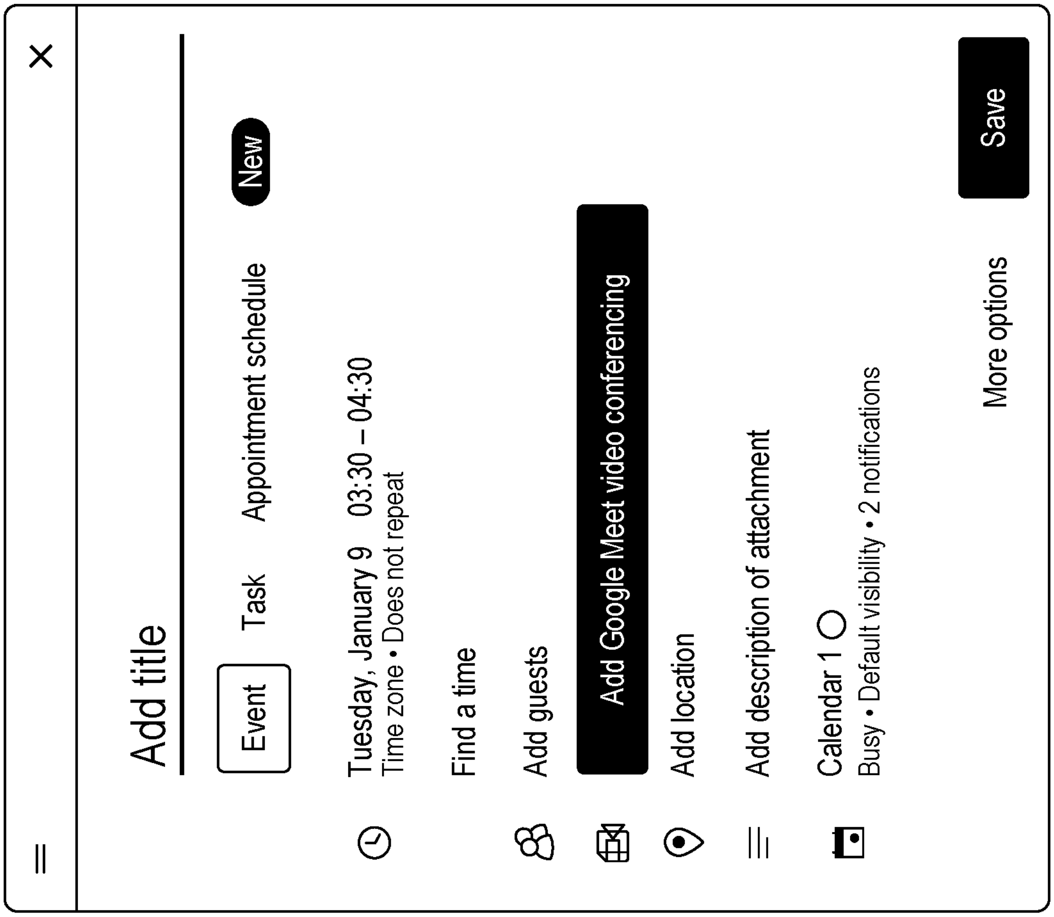
FIG. 1B (Prior Art)
FIG. 1B illustrates an example user interface of Google Calendar for creating an event, a task, or an appointment schedule.

The conventional way of using a calendar tool is rigid. In existing calendar applications, a user can create an event, a task, or an appointment on his/her own calendar. FIG. 1B shows an example user interface of Google Calendar for creating an event, a task, or an appointment schedule. As shown in FIG. 1B, an event has a fixed set of properties, such as the title, the time duration, and the descriptions. While some of the properties are optional (e.g., video conferencing information), a user needs to manually enter information in the mandatory fields to create individual events/appointments/tasks.

Figure 2A:
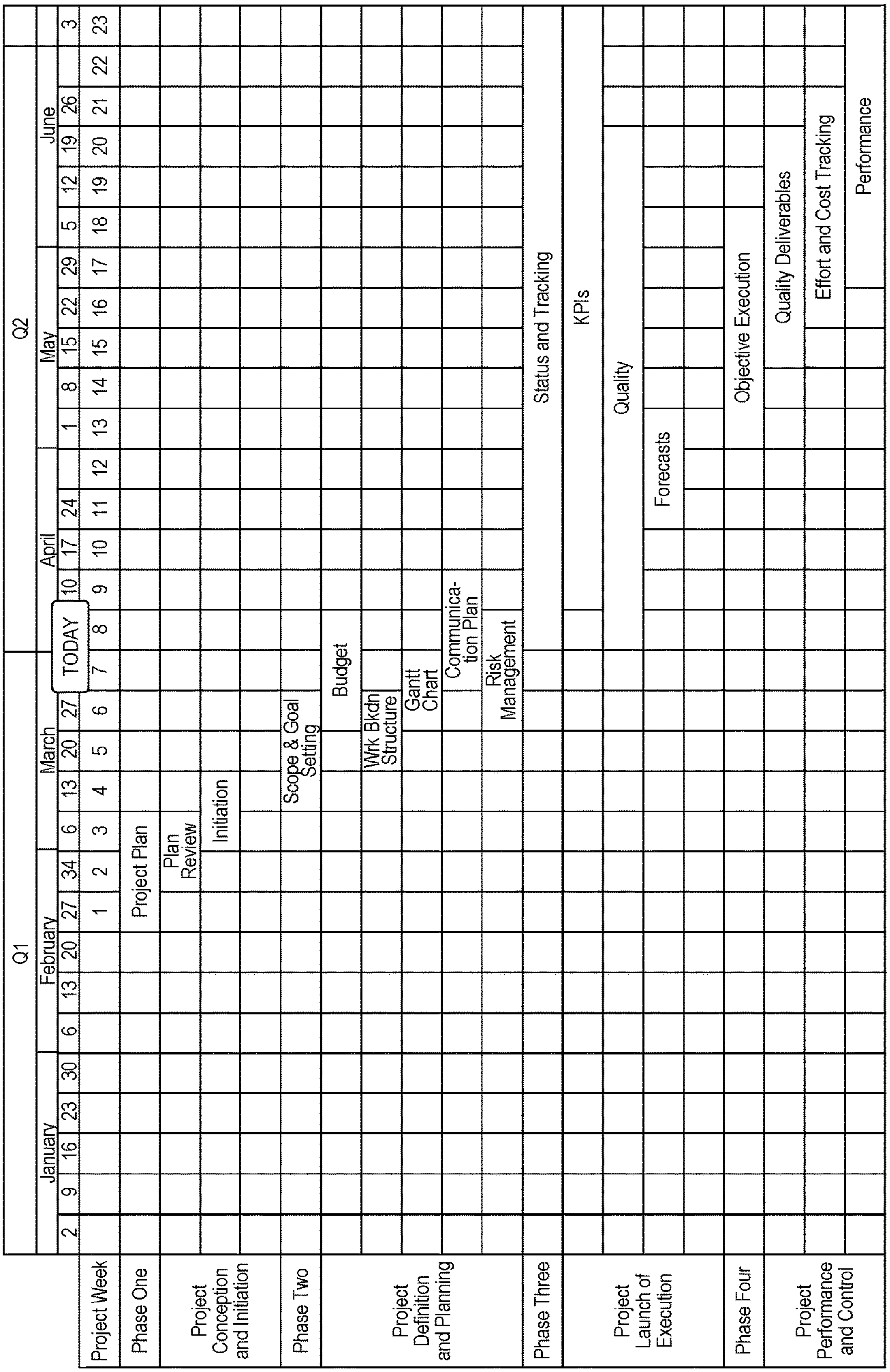
FIG. 2A (Prior Art)
FIG. 2A illustrates an example project timeline.

Due to the rigidity of its usage, the conventional calendar tool forms a small part of project management at the workplace. Other project management tools are often used to create, track, and update project tasks. For example, a planning tool is often used to create a project timeline, e.g., a project Gantt chart (a graphical representation of activity against time), such as shown in FIG. 2A. During the implementation of the task features, a tracking tool is often used to track individual issues or tasks. FIG. 2B shows an example user interface of a conventional tracking tool (e.g., JIRA). Implementation tasks of different projects are represented in a tabular format, showing the assignee and certain time properties (e.g., the date that the issue/task was reported/created, a target date for completion). However, because the tracking tool and timeline planning tool are two separate, discrete tools, automatic synchronization of respective information can be difficult to achieve. Users either forgo the usage of calendars for the purpose of task tracking or have to manually create calendar events to indicate their progress or availability for various tasks.

When team members work on different tasks of a project, they need to manually add the tasks to their respective calendars and choose to share their calendars among the team. They may also need to subscribe to a project calendar that includes events common to all the team members. Changes made to a part of the project (e.g., updates to selected tasks) may not be reflected or synchronized with various calendars. Accordingly, manual updates are often needed, resulting in management overhead. The conventional approach also performs poorly when the project scales up, particularly when sub-teams are formed to handle different aspects of a large-scale project.

This patent document discloses techniques that can be implemented in various embodiments to enable central management of project tasks along with personal schedules and work calendar(s). Project information can be created and updated in the form of multiple in-page objects and be displayed in different formats (e.g., as a timeline chart or in respective calendars) across different workspace pages. The disclosed techniques can also be extended beyond workspace project management to various aspects of scheduling management.

The integrated calendar tool lies on the foundation of a block data model. Blocks are content containers that function as data sources for storing various types of information. The data sources formed by the blocks are fundamentally different from the conventional relational databases in which a standard programming language, such as Structured Query Language (SQL), is needed to store and process information. Users can add, edit, and remove content from the blocks without many constraints. The content of the blocks can have rich formats that provide great flexibility for sharing ideas and increasing productivity across the team. Having a block-based database enables seamless sharing among the different templates within a workspace, thereby providing flexible ways of categorizing and prioritizing scheduled tasks, generating to-do and action item lists, and tracking productivity across teams.

Block Data Model

The disclosed technology includes a block data model ("block model"). The blocks are dynamic units of information that can be transformed into other block types and move across workspaces. The block model allows users to customize how their information is moved, organized, and shared. Hence, blocks contain information but are not siloed.

Blocks are singular pieces that represent all units of information inside an editor. In one example, text, images, lists, a row in a database, etc. are all blocks in a workspace. The attributes of a block determine how that information is rendered and organized. Every block can have attributes, including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested sub-pages inside of pages). The content attribute of a block stores the array of block IDs (or pointers) referencing those nested blocks. Each block defines the position and order in which its content blocks are rendered. This hierarchical relationship between blocks and their render children is referred to herein as a "render tree." In one example, page blocks display their content in a new page instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks' content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface—typing in the editor, dragging blocks around a page—these changes are expressed as operations that create or update a single record. The "records" refer to persisted data, like blocks, users, workspaces, etc. Because many actions usually change more than one record, operations are batched into transactions that are committed (or rejected) by the server as a group.

Creating and updating blocks can be performed by, for example, pressing enter on a keyboard. First, the client defines all the initial attributes of the block, generating a new unique ID, setting the appropriate block type (to_do), and filling in the block's properties (an empty title and checked: [["No"]]). The client builds operations to represent the creation of a new block with those attributes. New blocks are not created in isolation: blocks are also added to their parent's content array so they are in the correct position in the content tree. As such, the client also generates an operation to do so. All these individual change operations are grouped into a transaction. Then, the client applies the operations in the transaction to its local state. New block objects are created in memory, and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into TransactionQueue, the part of the client responsible for sending all transactions to the model's servers so that the data is persisted and shared with collaborators. TransactionQueue stores transactions safely in IndexedDB or SQLite (depending on the platform) until they are persisted by the server or rejected.

A block can be saved on a server to share with others. Usually, TransactionQueue sits empty, so the transaction to create the block is sent to the server in an API request. In one example, the transaction data is serialized to JSON and posted to the/saveTransactions API endpoint. SaveTransactions gets the data into source-of-truth databases, which store all block data, as well as other kinds of persisted records. Once the request reaches the API server, all the blocks and parents involved in the transaction are loaded. This gives a "before" picture in memory. The block model duplicates the "before" data that had just been loaded in memory. Then, the block model applies the operations in the transaction to the new copy to create the "after" data. Then, the model uses both "before" and "after" data to validate the changes for permissions and data coherency. If everything checks out, all created or changed records are committed to the database—meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction. For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client can have a long-lived WebSocket connection to MessageStore, which is a real-time updates service. When the client renders a block (or page or any other kind of record), the client subscribes to changes of that record from MessageStore using the WebSocket connection. When a team member opens the same page, the member is subscribed to changes of all those blocks. After changes have been made through the saveTransactions process, the API notifies MessageStore of newly recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, it sends a syncRecordValues API request to the server with the list of outdated client records. The server responds with the new record data. The client uses this response data to update the local cache with the new version of the records, then re-renders the user interface to display the latest block data.

Blocks can be shared instantaneously with collaborators. In one example, a page is loaded using only local data. On web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React.

Software Platform

Figure 3:
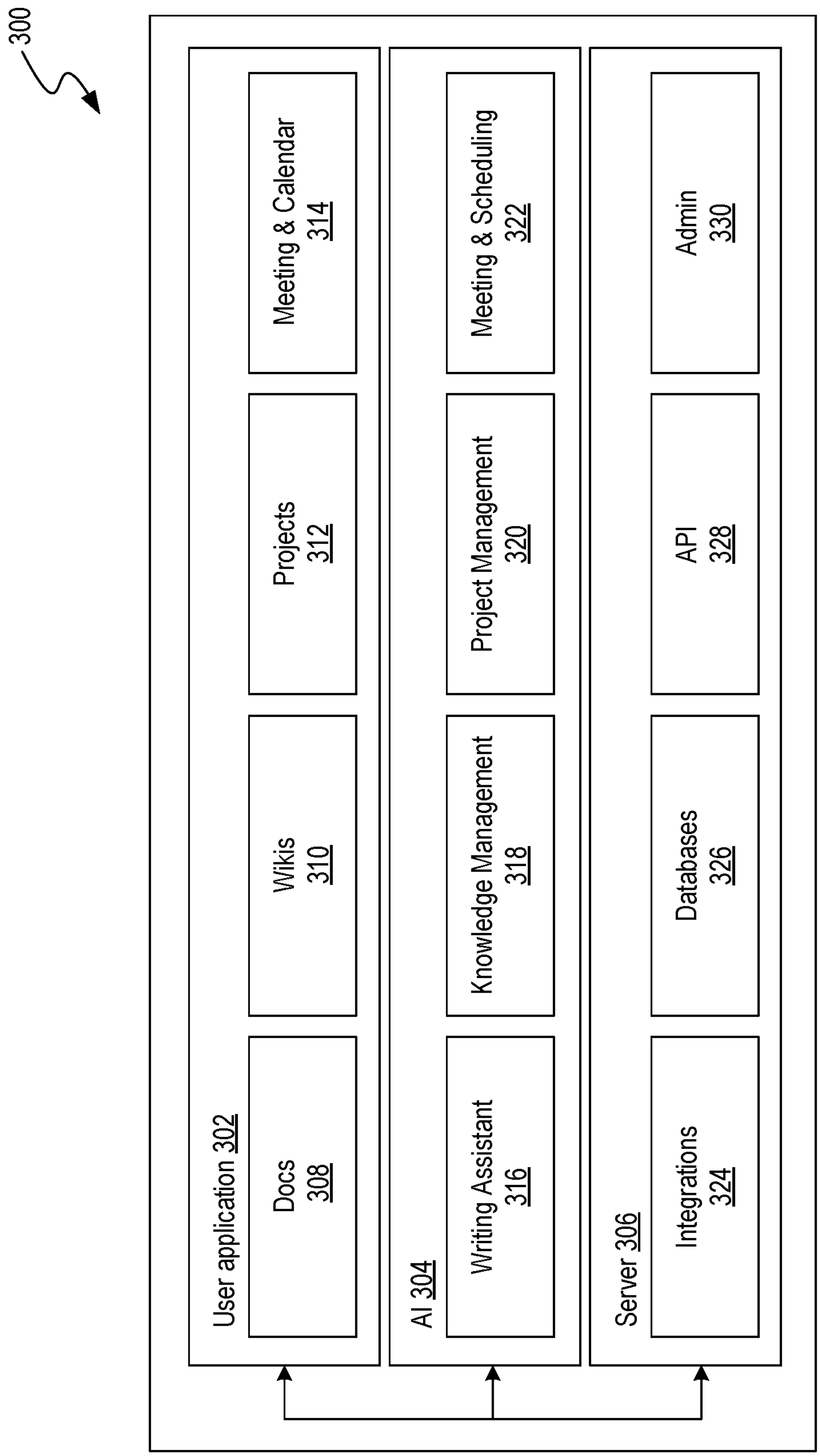
FIG. 3 is a block diagram of an example platform in accordance with one or more embodiments of the present technology.

FIG. 3 is a block diagram of an example platform 300 in accordance with one or more embodiments of the present technology. The platform 300 provides users with an all-in-one workspace for data and project management. The platform 300 can include a user application 302, an Artificial Intelligence (AI) tool 304, and a server 306. The user application 302, the AI tool 304, and the server 306 are in communication with each other via a network.

In some implementations, the user application 302 is a cross-platform software application configured to work on several computing platforms and web browsers. The user application 302 can include a variety of templates. A template refers to a prebuilt page that a user can add to a workspace within the user application 302. The templates can be directed to a variety of functions. Exemplary templates include a docs template 308, a wikis template 310, a projects template 312, and a meeting and calendar template 314. In some implementations, a user can generate, save, and share customized templates with other users.

The user application 302 templates can be based on content "blocks." For example, the templates of the user application 302 include a predefined and/or pre-organized set of blocks that can be customized by the user. Blocks are content containers within a template that can include text, images, objects, tables, maps, and/or other pages (e.g., nested pages or sub-pages). Blocks can be assigned to certain properties. The blocks are defined by boundaries having dimensions. A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 308 is a document generation and organization tool that can be used to generate a variety of documents. For example, the docs template 308 can be used to generate pages that are easy to organize, navigate, and format. The wikis template 310 is a knowledge management application with features similar to the pages generated by the docs template 308 but that can additionally be used as a database. The projects template 312 is a project management and note-taking software tool. The projects template 312 can allow the users, either as individuals or as teams, to plan, manage, and execute projects in a single forum.

The meeting and calendar template 314 is a tool for managing tasks and timelines. In addition to traditional calendar features, the meeting and calendar template 314 can include blocks for categorizing and prioritizing scheduled tasks, generating to-do and action item lists, tracking productivity, etc. The various templates of the user application 302 can be included under a single workspace and include synchronized blocks. For example, a user can update a project deadline on the projects template 312, which can be automatically synchronized to the meeting and calendar template 314. The various templates of the user application 302 can be shared within a team, allowing multiple users to modify and update the workspace concurrently.

The writing assistant tool 316 can operate as a generative AI tool for creating content for the blocks in accordance with instructions received from a user. Creating the content can include, for example, summarizing, generating new text, or brainstorming ideas. The knowledge management tool 318 can use AI to categorize, organize, and share knowledge included in the workspace. In some implementations, the knowledge management tool 318 can operate as a question-and-answer assistant. The project management tool 320 can provide AI support for the projects template 312. The AI support can include auto-filling information based on changes within the workspace or automatically track project development. The meeting and scheduling tool 322 can use AI to organize meeting notes, unify meeting records, list key information from meeting minutes, and/or connect meeting notes with deliverable deadlines.

The server 306 can include various units (e.g., including compute and storage units) that enable the operations of the AI tool 304 and workspaces of the user application 302. The server 306 can include an integrations unit 324, an application programming interface (API) 328, databases 326, and an administration (admin) unit 330. The databases 326 are configured to store data associated with the blocks. The data associated with the blocks can include information about the content included in the blocks, the function associated with the blocks, and/or any other information related to the blocks. The API 328 can be configured to communicate the block data between the user application 302, the AI tool 304, and the databases 326. The API 328 can also be configured to communicate with remote server systems, such as AI systems. For example, when a user performs a transaction within a block of a template of the user application 302 (e.g., in a docs template 308), the API 328 processes the transaction and saves the changes associated with the transaction to the database 326. The integrations unit 324 is a tool connecting the platform 300 with external systems and software platforms. Such external systems and platforms can include other databases (e.g., cloud storage spaces), messaging software applications, or audio or video conference applications. The administration unit 330 is configured to manage and maintain the operations and tasks of the server 306. For example, the administration unit 330 can manage user accounts, data storage, security, performance monitoring, etc.

Integrated Calendar and Workspace

Figure 4:
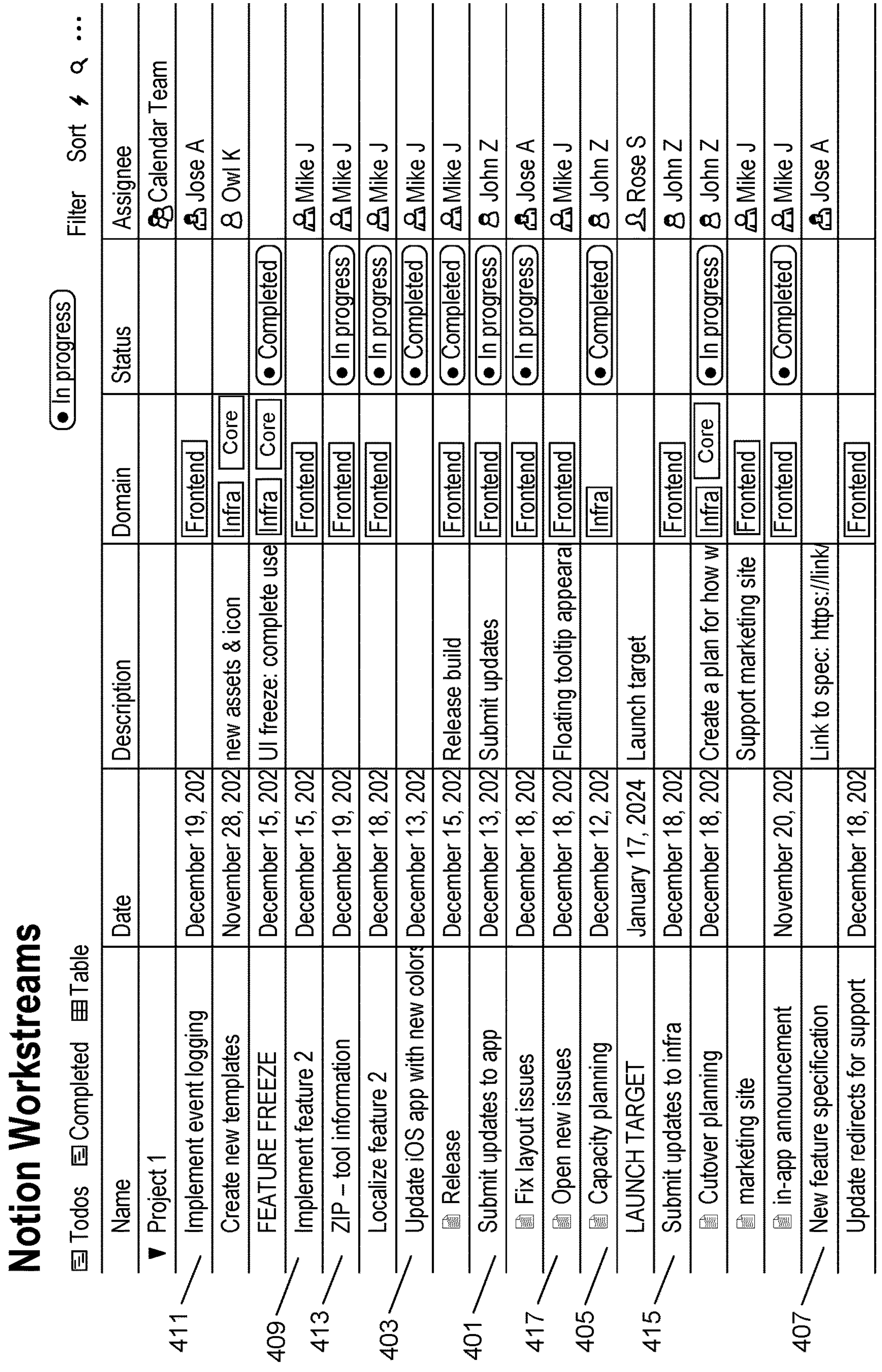
FIG. 4 illustrates an example tabular representation of blocks associated with a project in accordance with one or more embodiments of the present technology.

FIG. 4 illustrates an example tabular representation of blocks associated with a project in accordance with one or more embodiments of the present technology. Compared to entries in a relational database having keys, blocks in the block model are not required to have a specific property. As shown in FIG. 4, while the items in this example table are related to the same project, some items do not have a date (e.g., "new feature specification" block 407), some do not have a description (e.g., "capacity planning" block 405), and some do not have any assigned domain (e.g., "update iOS app with new colors" block 403), etc. Blocks can have rich content, such as images, video, audio, meeting links/invites, and/or animation. Data sources formed based on blocks thus provide a lot more flexibility as compared to conventional databases and/or calendar tools.

The user can create blocks and/or drag/drop existing blocks and group them together if they are related to the same project. The blocks can then be represented as different templates, e.g., project management tool 320 and/or meeting & scheduling tool 322, such as shown in FIG. 3. Changes to the blocks can be synchronized across different templates automatically.

A large-scale project often includes multiple sub-projects or domains. In some embodiments, to facilitate management of tasks in large-scale projects and allow displaying of the blocks across different pages in the workspace, the user can assign a block to a specific domain (e.g., "Frontend") so that information included in the block can be displayed in a corresponding domain-specific template (e.g., a Frontend-specific calendar view showing relevant tasks). In some embodiments, the platform can automatically determine and assign a domain to the block based on its content. Blocks that have one or more time properties can be displayed in the calendar. In some embodiments, additional configurations can be provided such that blocks having no time property (e.g., block 407 in FIG. 4) can be displayed as a persistent item on the calendar.

Figure 5:
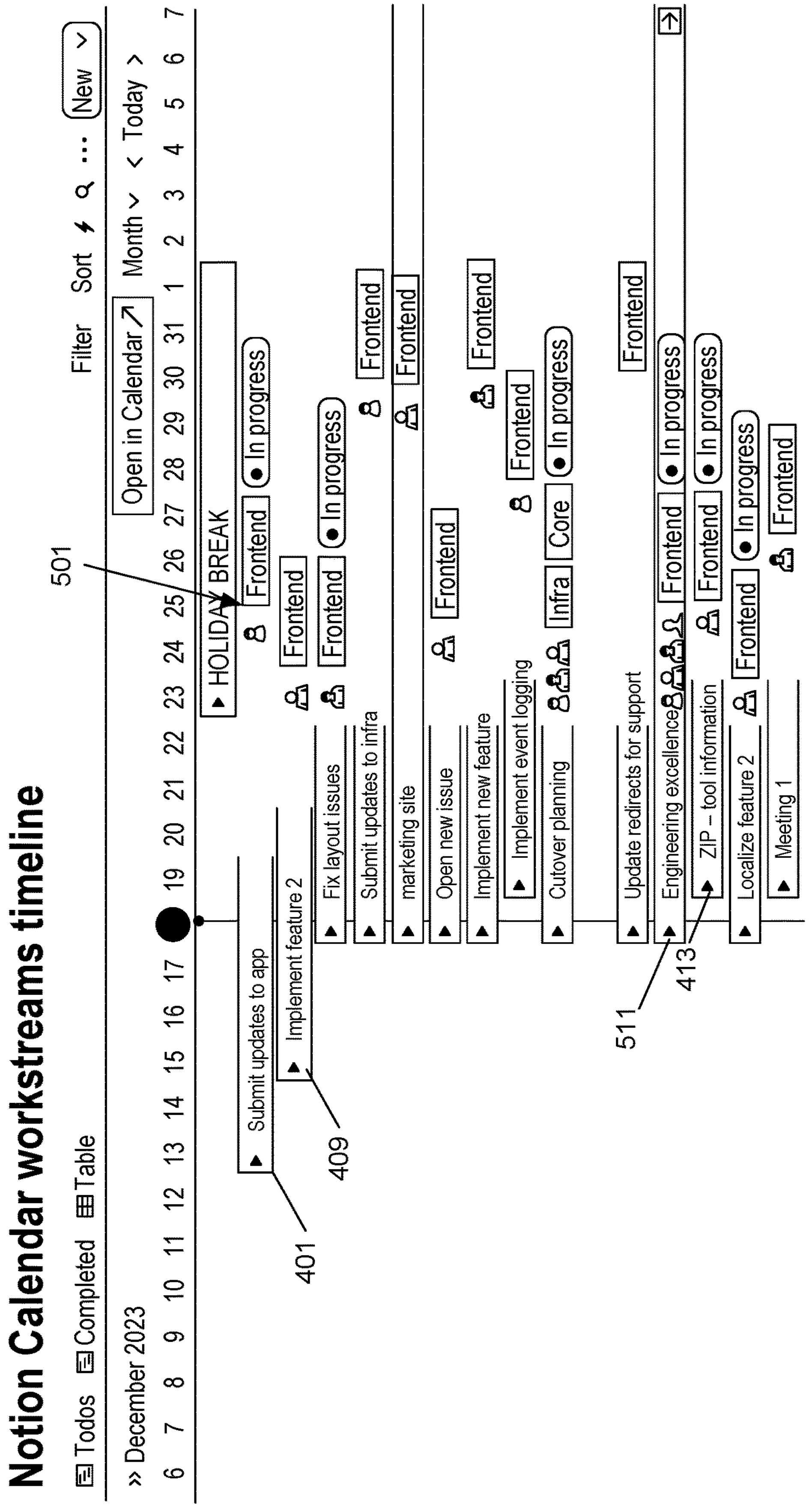
FIG. 5 illustrates an example project timeline corresponding to the blocks in FIG. 4 in accordance with one or more embodiments of the present technology.

In the example shown in FIG. 4, blocks that are assigned to different domains (e.g., Frontend, Core, Infra) are displayed in the calendar pages of the team members. In addition, blocks can also be organized and displayed for project management purposes. For example, a project timeline or a project Gantt chart can be created automatically based on the blocks. FIG. 5 illustrates an example project timeline corresponding to the blocks in FIG. 4 in accordance with one or more embodiments of the present technology. As shown in FIG. 5, the platform can automatically position blocks (e.g., tasks, events, milestones) according to the respective time properties.

For example, block 401 "Submit updates to app" in FIG. 4 is assigned to domain "Frontend" in the data source and is displayed correspondingly at the position of Dec. 13, 2023, in the timeline chart. The status of the block item (e.g., "In progress") is displayed on the right. Similarly, block 409 "Implement feature 2" is automatically positioned for Dec. 15, 2023, in the timeline chart. If the block content is updated in the data source, the updates are automatically reflected in the timeline without the need for any manual updates. In some embodiments, block items that are not assigned to the Calendar domain, such as block 403 "Update iOS app with new colors" and block 405 "Capacity planning," are not visible in the timeline.

In some embodiments, the timeline representing the tasks that the team is responsible for a period time can be integrated with the work calendars of the team members. The integration can provide an overview of the assignees' schedules so as to enable a quick determination of whether there is a bandwidth and/or work allocation issue for the project. For example, as shown in FIG. 5, the assignee for block 401 is John Z, and a link to his work calendar 501 is shown in the timeline chart to enable a quick view of his workload and deadlines.

In some embodiments, multiple data sources (e.g., multiple tables of blocks) can be used to generate the project timeline. For example, block 511 ("Engineering excellence") in FIG. 5 is generated from another data source (not shown) that includes team-wide project events. In some embodiments, a personal task timeline can be built based on data sources of various aspects (e.g., personal information, family information, work related information) so that the personal task timeline becomes a central portal to track events and tasks related to the user.

Figure 6:
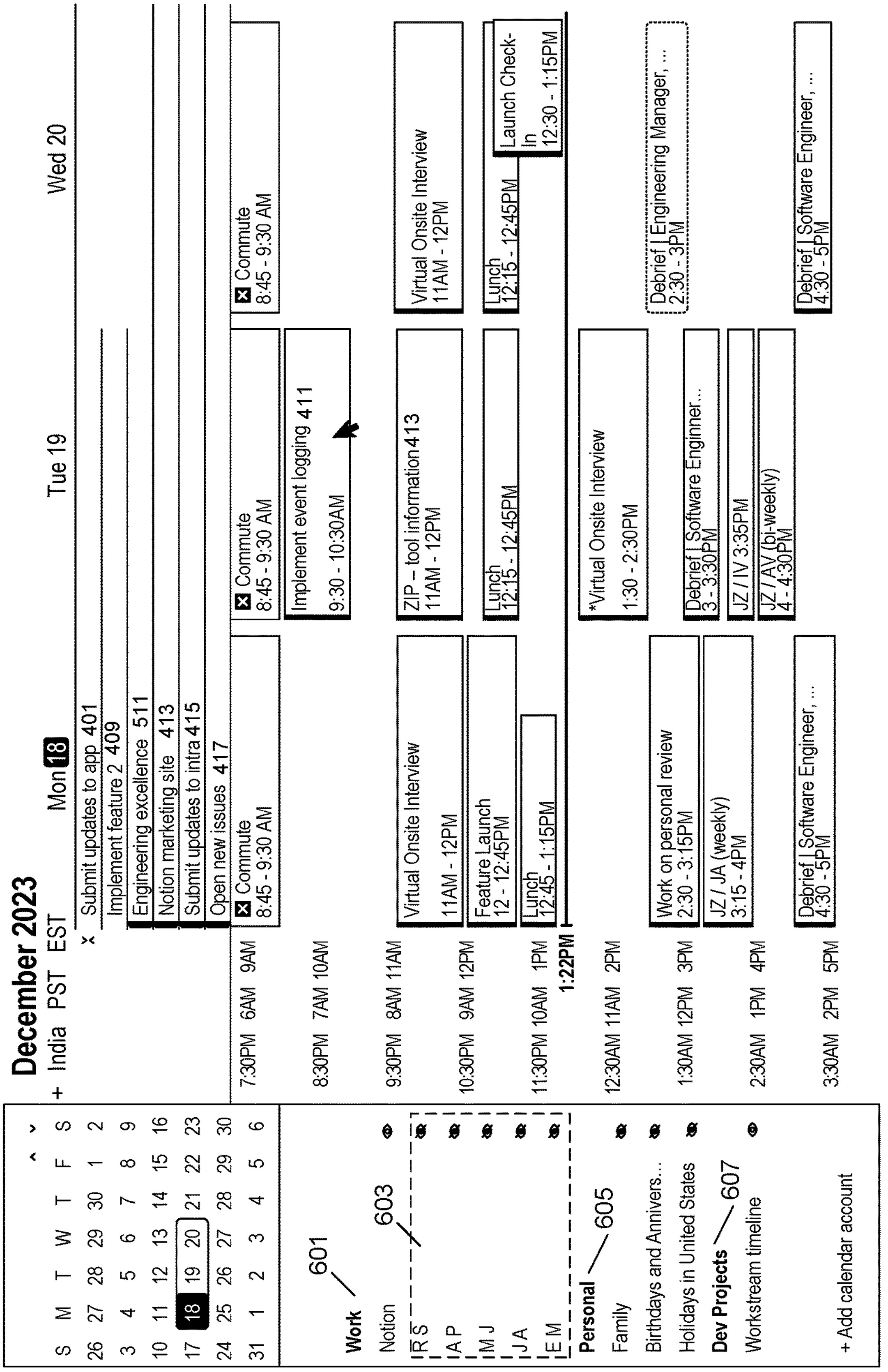
FIG. 6 illustrates an example calendar view integrating work items and personal activities in accordance with one or more embodiments of the present technology.

In some embodiments, the platform can also provide an integration of personal calendar tools so that a single calendar page becomes the central portal for organizing one's daily activities. FIG. 6 illustrates an example calendar view integrating work items and personal activities in accordance with one or more embodiments of the present technology. Individual work calendar(s) 601 can include information that is specific to certain workdays and not related to a project (e.g., commute/lunchtime, virtual onsite interviews, one-to-one meetings with other team members). Team members can choose to share their calendars with each other. For example, in this example, five team members 603 have chosen to share at least a portion of their calendars with the team lead. Users can collaborate work with coworkers using an approach that is similar to a conventional calendar.

Personal calendar information 605 can also be integrated by subscribing to the personal calendar tools (e.g., Google Calendar). In this example, a subscription to the Family calendar has been added. Visibility of the personal calendar can be toggled based on user needs. In some embodiments, the user can edit the personal calendar information directly at the integrated calendar page, and the changes are automatically populated to the personal calendar tools via the Application Programming Interface (API) provided by those calendar tools.

In addition to the individual work calendar and personal calendar(s), project-related information 607 can be integrated and displayed so that a user's schedules can be managed at one central portal. For example, when the user toggles to make items related to the project timeline visible, block items corresponding to the ones shown in FIG. 5 are displayed on the calendar interface. Multi-day blocks, such as block 401 ("Submit updates to app"), block 409 ("Implement feature 2"), block 511 ("Engineering excellence"), etc., are displayed at the top of the daily calendar as they span across multiple days. Single-day items, such as block 411 ("Implement event logging") and block 413 ("ZIP—tool information"), are shown on the corresponding day at the respective time durations.

In some embodiments, a block can be associated with multiple time properties. For example, a block can be associated with a specific date (e.g., Dec. 18, 2023). The block can be associated with a specific time duration on that day (e.g., 9:30-10:30 am Pacific time). As another example, a block can be a multi-day item (e.g., from Dec. 15, 2023, to Dec. 20, 2023). For each day in the multi-day range, the block can be associated with the same time duration (e.g., a recurring event) or different time durations. In this example, both the date property (e.g., Dec. 19, 2023) and the time duration property (e.g., 9:30-10:30 am, 11 am-12 pm) are displayed on the calendar.

As another example, a block can be associated with multiple types of time properties, such as due date, execution time, etc. The user can select which properties are viewable on the calendar: one calendar view can show the due dates of the tasks, and a separate calendar view can show the planned execution date/time for performing the tasks.

Figure 7A:
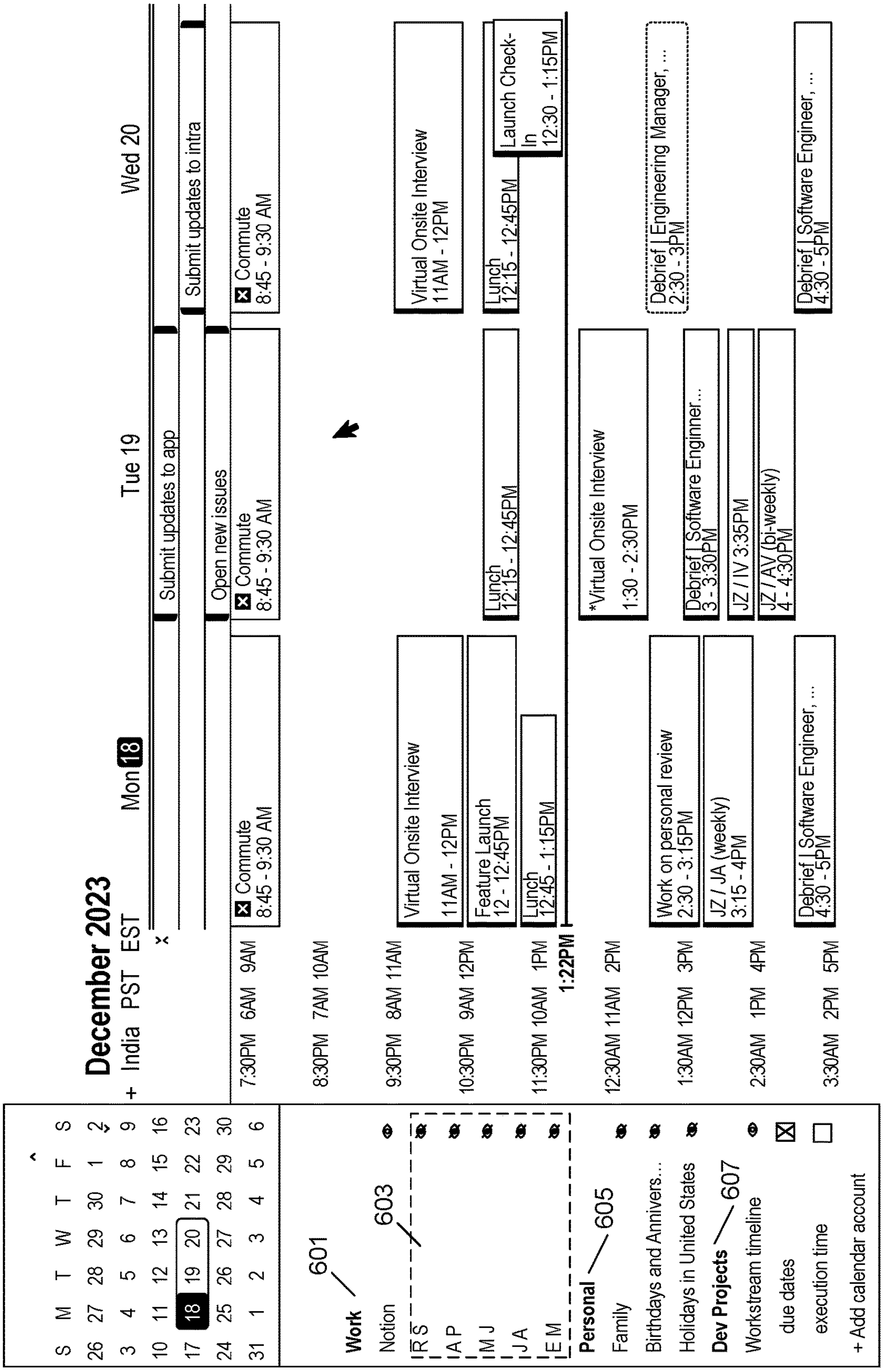
FIG. 7A illustrates an example view of a calendar page in accordance with one or more embodiments of the present technology.
Figure 7B:
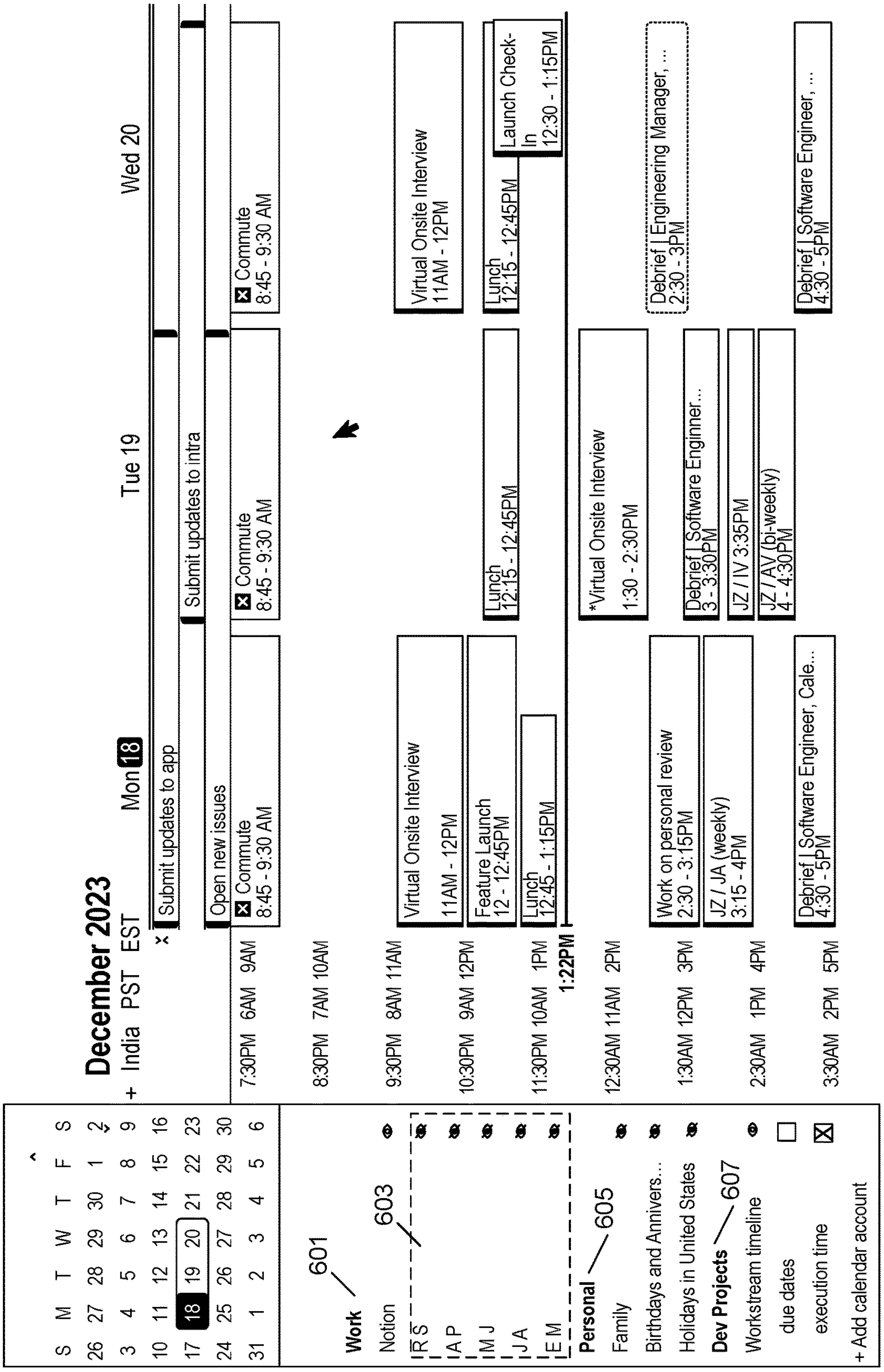
FIG. 7B illustrates another example view of a calendar page in accordance with one or more embodiments of the present technology.

FIG. 7A illustrates an example view of a calendar page in accordance with one or more embodiments of the present technology. In this example, only the due dates of the blocks are visible. The user can quickly get an overview of the upcoming due dates of the tasks and allocate time accordingly to ensure that the due dates are met. FIG. 7B illustrates another example view of a calendar page in accordance with one or more embodiments of the present technology. In this example, the planned execution time/dates for the corresponding tasks are displayed to provide proper workload tracking/progress monitoring. Given the calendar view of the task plans, an assignee can quickly review his or her own schedule and re-evaluate the time needed to complete the task. For example, as shown in FIG. 7B, the users can adjust the planned time for completing the tasks based on the due dates. In some embodiments, both the due dates and the planned execution date/time so that the user can easily adjust task planning for the project. In some embodiments, based on the user's bandwidth, the due dates need to be updated, and other team members associated with the same tasks can be notified of the changes.

Figure 8:
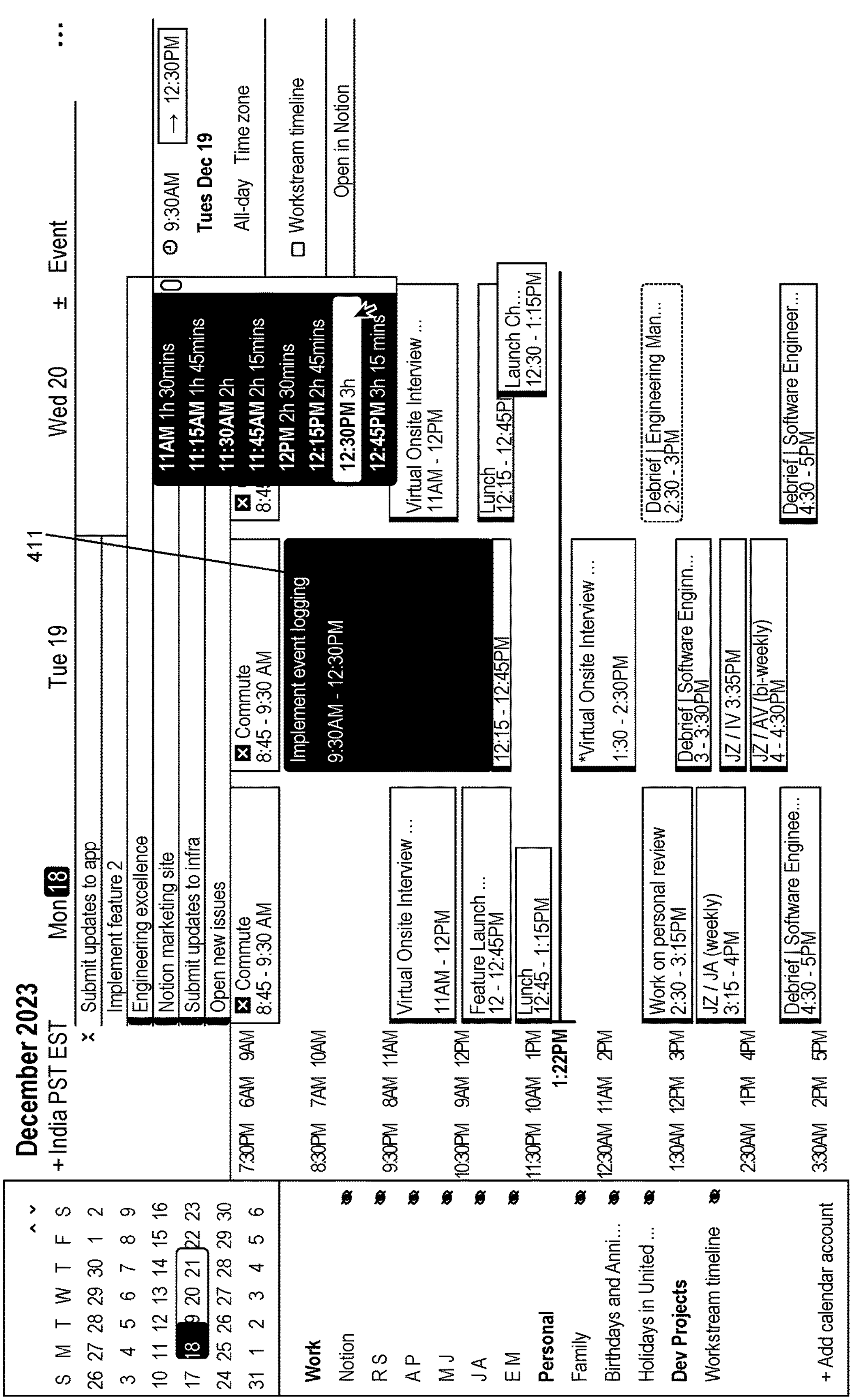
FIG. 8 illustrates an example of adjusting a project-related block in a user's calendar in accordance with one or more embodiments of the present technology.

FIG. 8 illustrates an example of adjusting a project-related block in a user's calendar in accordance with one or more embodiments of the present technology. In this example, the assignee of the block 411 ("Implement event logging") determines that the time needed for this task should be around 3 hours instead of the initial estimate of 1.5 hours. The assignee updates the task on the calendar interface and may adjust the lunch hour on that day to ensure the completion of the task.

Figure 9A:
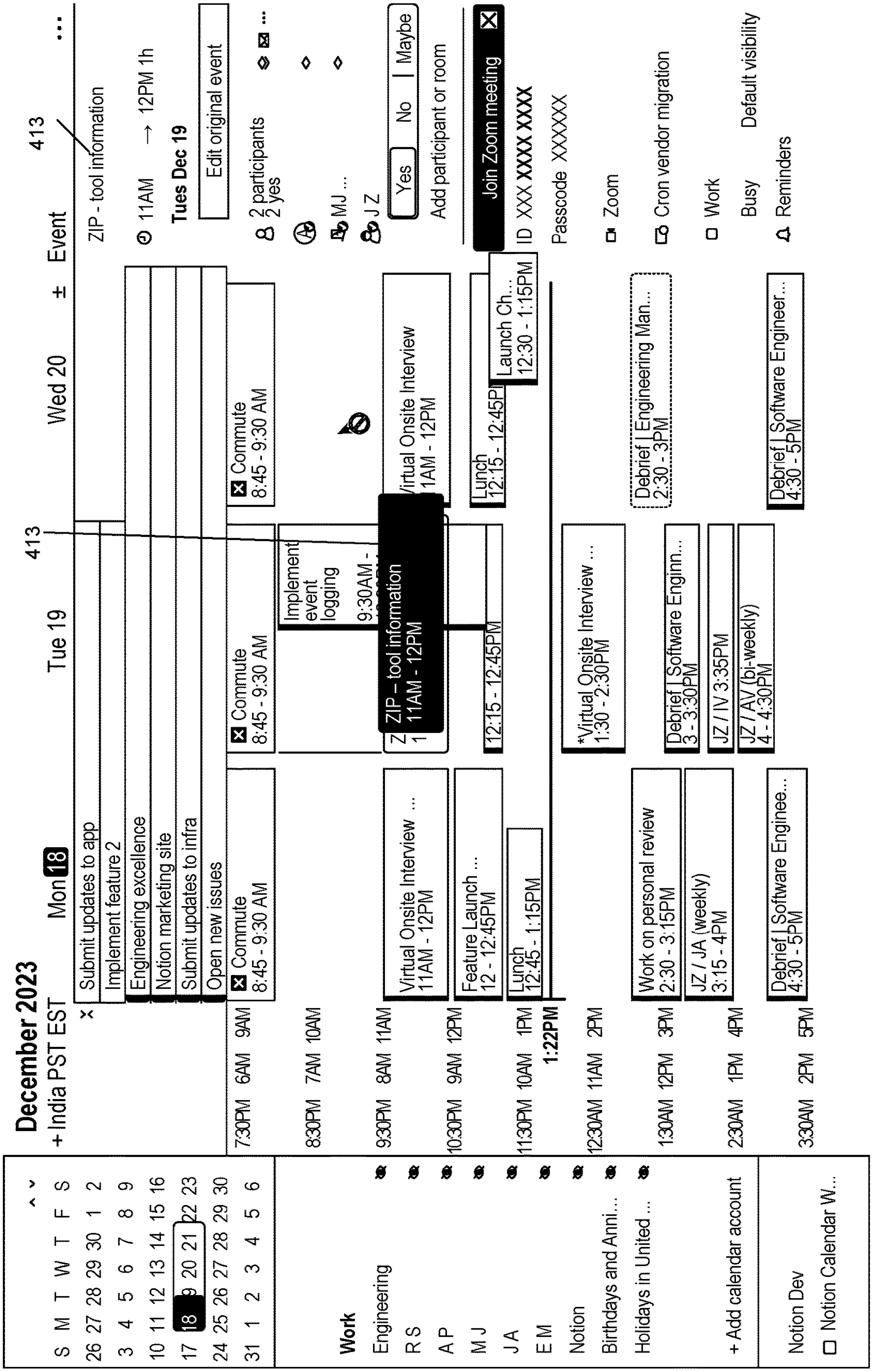
FIG. 9A illustrates another example of adjusting a project-related block in a user's calendar in accordance with one or more embodiments of the present technology.
Figure 9B:
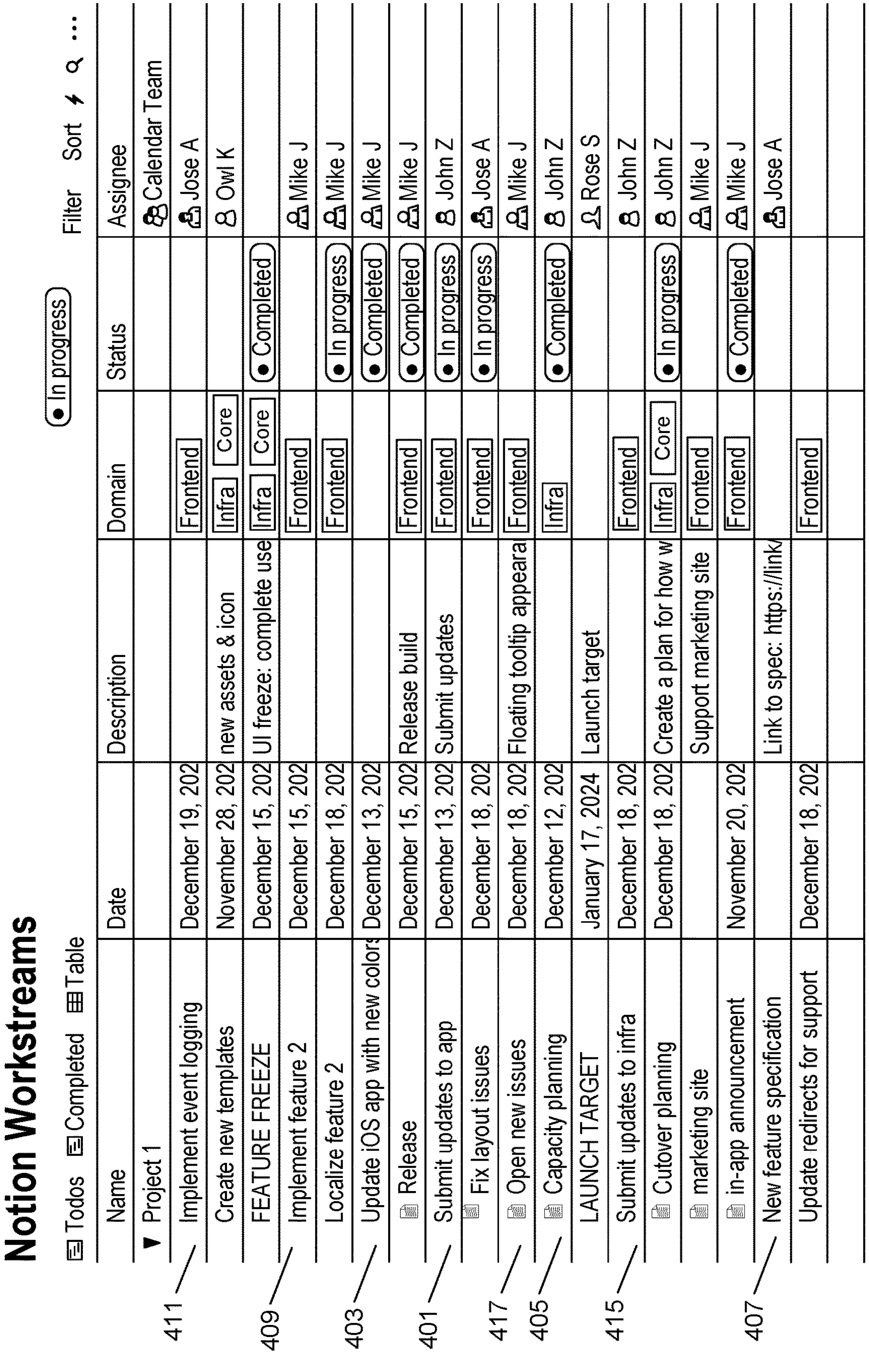
FIG. 9B illustrates an example of an updated tabular representation of blocks associated with a project in accordance with one or more embodiments of the present technology.

Modifications to the blocks on the calendar view are automatically synchronized to the data source and other representations of the project data. For example, the tabular view of the data source shown in FIG. 4 is automatically synchronized after the assignee makes the changes to block 411 in the calendar view. FIG. 9A illustrates another example of adjusting a project-related block in a user's calendar in accordance with one or more embodiments of the present technology. In this example, the assignee decides to cancel a project-related meeting (block 413, "ZIP—tool information") because the implementation of the event logging will take longer than originally expected. Once the meeting is canceled on the calendar view, the block is automatically removed from the tabular data source, as shown in FIG. 9B. The original participants of the meeting are also notified immediately about the cancellation.

In some embodiments, team members can subscribe to changes to the project information. In some embodiments, a member can subscribe to all changes made to the project so that he or she can be notified whenever changes occur regarding the project. In some embodiments, a member can subscribe to part of the changes that is relevant to his or her assignment.

In some embodiments, when a main project scales up, sub-projects and/or sub-tasks can be created. The relationship between the blocks (e.g., a hierarchical relationship between parent tasks and sub-tasks), which can be cumbersome to show in a tabular format (e.g., as shown in FIG. 4), can be more clearly represented in the timeline and/or the calendar view. Management of the sub-projects and/or sub-tasks can focus on the specific assignees that are assigned to the sub-projects and/or sub-tasks to avoid information overloading for the bigger team.

Figure 10A:
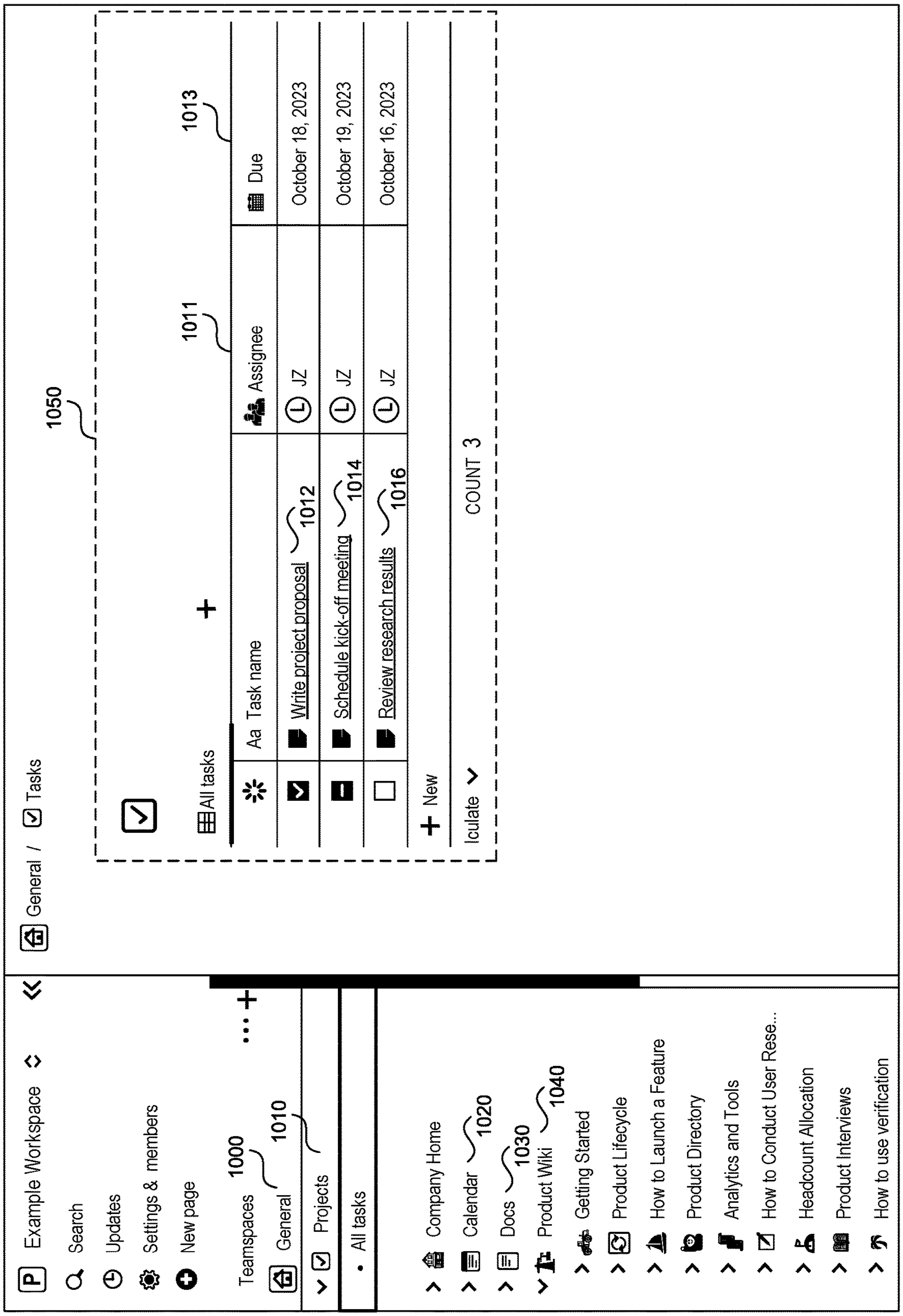
FIG. 10A illustrates an example teamspace providing integrated features in accordance with one or more embodiments of the present technology.

FIG. 10A illustrates an example teamspace providing integrated features in accordance with one or more embodiments of the present technology. Specifically, the teamspace 1000 includes the following features (e.g., blocks): projects 1010, calendar 1020, documents (shown as "Docs") 1030, and wikis (shown as "Product Wiki") 1040. Features such as projects 1010, calendar 1020, docs 1030, and wiki 1040 can include software that is running on a cloud and is made available to the user through a web-based interface.

Projects 1010 enable users to manage project timelines and to record project-related information (e.g., tasks, due dates, milestones). Calendar 1020 enables the user to view individual work events and the project information together using one interface. Documents 1030 enable the user to create documents, and wikis 1040 enable the user to create wiki pages explaining features, products, or plans associated with the teamspace 1000.

A user can select one particular project to view the blocks associated with that project. Alternatively, the user can select "All tasks" that are assigned to the user. The system shows the task panel 1050 presenting the various tasks 1012, 1014, and 1016 on the right side of the user interface, similar to the example shown in FIG. 4.

Figure 10B:
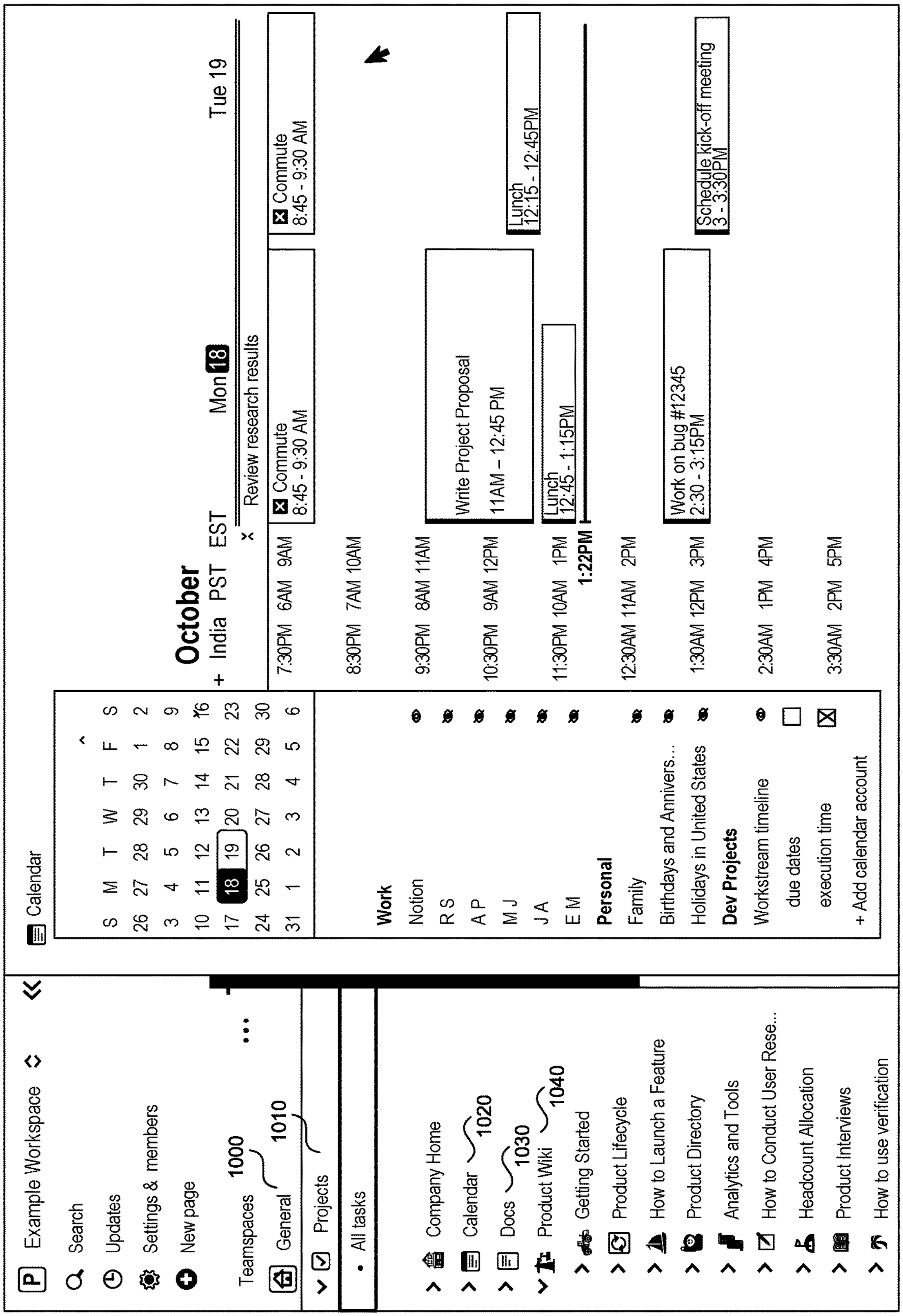
FIG. 10B illustrates another example teamspace providing integrated features in accordance with one or more embodiments of the present technology.

FIG. 10B illustrates another example teamspace providing integrated features in accordance with one or more embodiments of the present technology. When the user selects the calendar 1020, the tasks shown in the task panel are displayed in the calendar view accordingly. The user can adjust the displayed days/week, and toggle on/off different options to view the personal and work tasks/appointments on selected days. Changes that made via the calendar view are automatically updated to the projects 1010 in the task/tabular view (e.g., shown in FIG. 10A). Similarly, changes made to the projects 1010 are automatically populated to the calendar 1020 to enable efficient task tracking and timeline management.

The disclosed technology includes an all-in-one integrated workspace that incorporates the described AI and prompts functionality. For example, project management can be performed by different views/layers (e.g., timeline, calendar view of due dates, calendar view of execution time) connected to the same block model. Task completions that are reflected in the calendar also update the underlying block model for project management.

Figure 11:
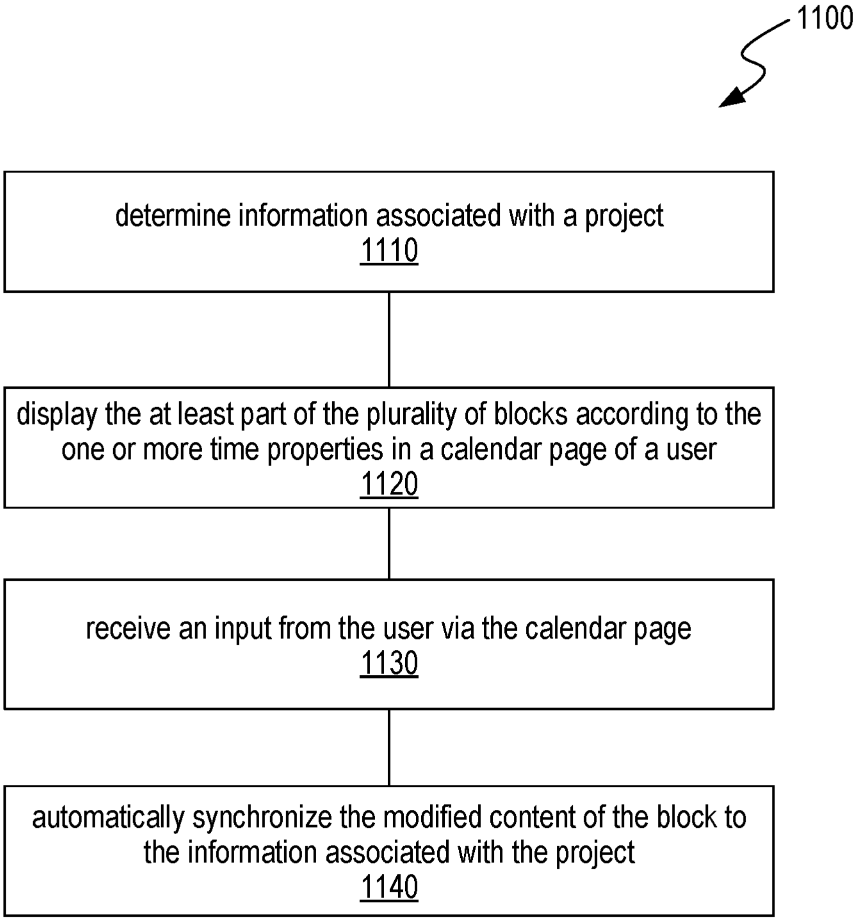
FIG. 11 is a flowchart representation of a computer-implemented method for integrating project information in a calendar view of a workspace in accordance with one or more embodiments of the present technology.

FIG. 11 is a flowchart representation of a computer-implemented method 1100 for integrating project information in a calendar view of a workspace in accordance with one or more embodiments of the present technology. The method 1100 includes, at operation 1110, determining information associated with a project. The information associated with the project is represented as a plurality of blocks. Each of the plurality of blocks is embedded as an in-page object on a page of the workspace. At least part of the plurality of blocks includes one or more time properties. The method

1100 includes, at operation 1120, displaying the at least part of the plurality of blocks according to the one or more time properties in a calendar page of a user who participates in the project. The method 1100 includes, at operation 1130, receiving an input from the user via the calendar page. The input modifies content of a block in the at least part of the plurality of blocks. The method 1100 also includes, at operation 1140, automatically synchronizing the modified content of the block to the information associated with the project.

In some embodiments, the method includes displaying, in a timeline page of the project, the at least part of the plurality of blocks according to the one or more time properties and updating the timeline page of the project upon the content of the block being modified by the user. In some embodiments, the method includes providing, on the timeline page of the project, a link to the calendar page of the user. In some embodiments, the method includes sending a notification to other users who are associated with content of the block.

In some embodiments, the one or more time properties of the at least part of the plurality of blocks comprise a due date, and the method comprises displaying, in a first view of the calendar page, one or more blocks according to the respective due date. In some embodiments, the one or more time properties of the at least part of the plurality of blocks comprise a planned execution time, and the method comprises displaying, in a second view of the calendar page, one or more blocks according to the respective planned execution time.

In some embodiments, the method includes displaying, together with the information associated with the project, user-specific information in the calendar page. The user-specific information is retrieved from a calendar service (e.g., Outlook, Google Calendar). The method includes receiving a second input from the user via the calendar page. The second input modifies content of the user-specific information. The method also includes updating, via an Application Programming Interface (API) provided by the calendar service, the user-specific information based on the second input.

Figure 12:
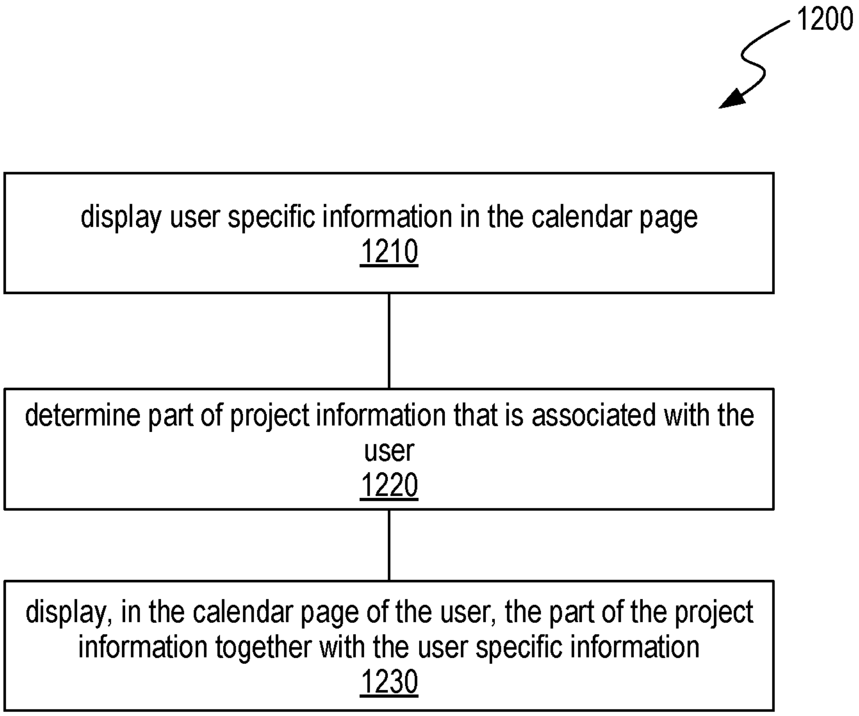
FIG. 12 is a flowchart representation of another computer-implemented method for integrating project information in a calendar view of a workspace in accordance with one or more embodiments of the present technology.

FIG. 12 is a flowchart representation of a computer-implemented method 1200 for integrating project information in a calendar view of a workspace in accordance with one or more embodiments of the present technology. The method 1200 includes, at operation 1210, displaying user-specific information in the calendar page. The user-specific information comprises at least one of an event, an appointment, or a task created by the user. The method 1200 includes, at operation 1220, determining part of project information that is associated with the user. The project information is represented as a plurality of blocks. Each of the plurality of blocks is embedded as an in-page object on a page of a workspace of the user. The method 1200 includes, at operation 1230, displaying, in the calendar page of the user, the part of the project information together with the user-specific information according to a user selection of a specific view. The specific view comprises at least one of (1) a due-date view in which a first part of the plurality of blocks that comprises a due-date property is displayed in the calendar page; and/or (2) a planned execution view in which a second part of the plurality of blocks that comprises a planned execution property is displayed in the calendar page.

In some embodiments, the method includes providing a timeline view of the project information displayed according to one or more time properties of the project information. A link to the calendar page of the user is provided as part of the timeline view of the project information.

In some embodiments, the method includes automatically updating the plurality of blocks representing the project information on the page of the workspace upon a change made by the user on the calendar page. In some embodiments, the method includes sending a notification of the change to other users who are associated with the part of the project information. In some embodiments, the method includes automatically updating the calendar page upon detecting a change made to the part of the project information.

In some embodiments, the project information comprises a block that spans across multiple days, and the block is displayed above the user-specific information in the calendar page. In some embodiments, the project information comprises a block that occupies a number of hours on a single day, and the block is displayed together with corresponding user-specific information on the day.

Computer System

Figure 13:
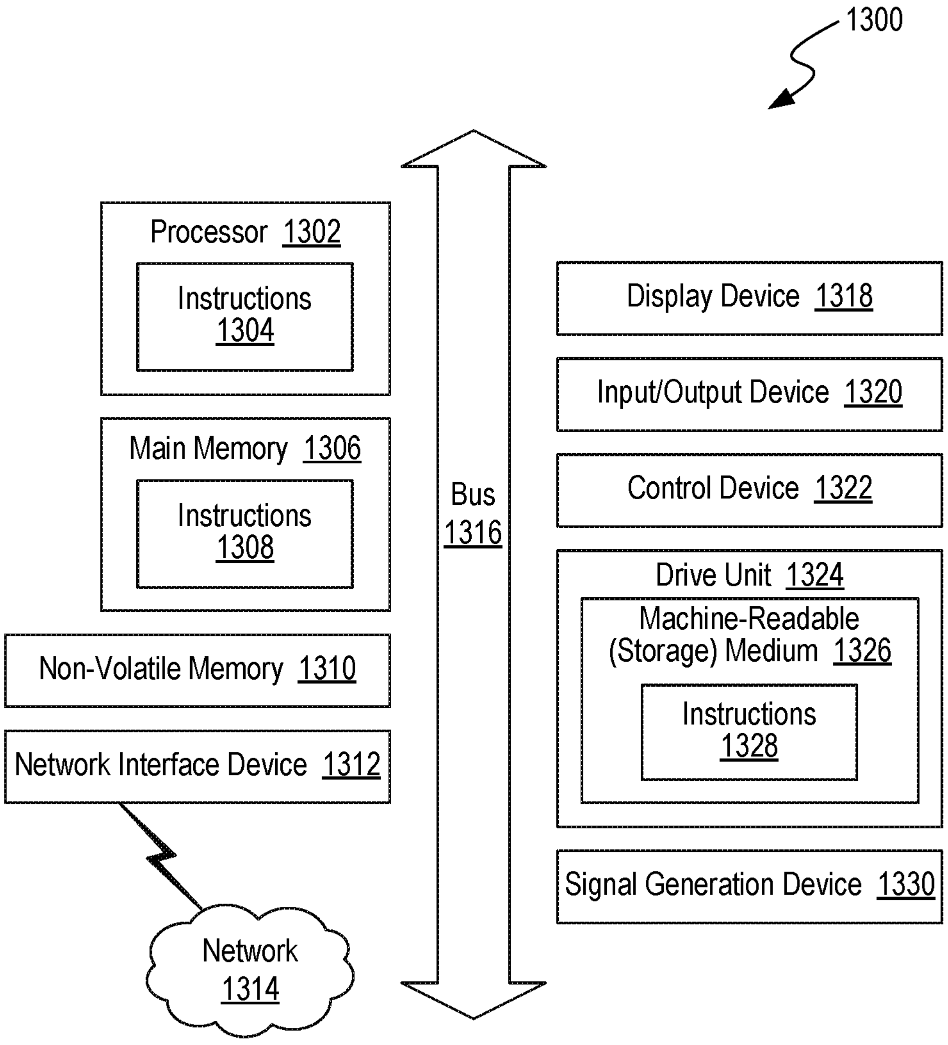
FIG. 13 is a block diagram that illustrates an example of a computer system in which at least some operations described herein can be implemented.

FIG. 13 is a block diagram that illustrates an example of a computer system 1300 in which at least some processes described herein can be implemented (e.g., methods 1100, 1200 described respectively with respect to FIG. 11 and FIG. 12). As shown, the computer system 1300 can include one or more processors 1302, main memory 1306, non-volatile memory 1310, a network interface device 1312, a display device 1318, an input/output device 1320, a control device 1322 (e.g., keyboard and pointing device), a drive unit 1324 that includes a machine-readable (storage) medium 1326, and a signal generation device 1330 that are communicatively connected to a bus 1316. The bus 1316 represents one or more physical buses and/or point-to-point connections that are connected by appropriate bridges, adapters, or controllers. Various common components (e.g., cache memory) are omitted from FIG. 13 for brevity. Instead, the computer system 1300 is intended to illustrate a hardware device on which components illustrated or described relative to the examples of the figures and any other components described in this specification can be implemented.

The computer system 1300 can take any suitable physical form. For example, the computer system 1300 can share a similar architecture as that of a server computer, personal computer (PC), tablet computer, mobile telephone, wearable electronic device, network-connected ("smart") device (e.g., a television or home assistant device), AR/VR system (e.g., head-mounted display), or any electronic device capable of executing a set of instructions that specify action(s) to be taken by the computer system 1300. In some implementations, the computer system 1300 can be an embedded computer system, a system-on-chip (SOC), a single-board computer (SBC) system, or a distributed system such as a mesh of computer systems or include one or more cloud components in one or more networks. Where appropriate, one or more computer systems 1300 can perform operations in real time, near real time, or batch mode.

The network interface device 1312 enables the computer system 1300 to mediate data in a network 1314 with an entity that is external to the computer system 1300 through any communication protocol supported by the computer system 1300 and the external entity. Examples of the network interface device 1312 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1306, non-volatile memory 1310, machine-readable medium 1326) can be local, remote, or distributed. Although shown as a single medium, the machine-readable medium 1326 can include multiple media (e.g., a centralized/distributed database and/or associated caches and servers) that store one or more sets of instructions 1328. The machine-readable medium 1326 can include any medium that is capable of storing, encoding, or carrying a set of instructions for execution by the computer system 1300. The machine-readable medium 1326 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1310, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1304, 1308, 1328) set at various times in various memory and storage devices in computing device(s). When read and executed by the processor 1302, the instruction(s) cause the computer system 1300 to perform operations to execute elements involving the various aspects of the disclosure.

The computer system 1300 can be configured to access a remote language model server (e.g., a cloud-based language model) via the API 328 or the network interface device 1312. For example, the computer system 1300 can communicate with a remote generative AI system to send instructions to and receive content from the generative AI system.

Remarks

The terms "example," "embodiment," and "implementation" are used interchangeably. For example, references to "one example" or "an example" in the disclosure can be, but are not necessarily, references to the same implementation, and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties except for any subject matter disclaimers or disavowals and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or in a continuing application.

What is claimed is:

1. A computer-implemented method for integrating project information in a calendar view of a workspace, the method comprising:

obtaining information associated with a project, wherein the information is represented as a plurality of blocks, wherein each of the plurality of blocks is embedded as an in-page object on a page of the workspace, wherein the plurality of blocks includes parent blocks and child blocks that have hierarchical relationships within the workspace, wherein each of the plurality of blocks is stored, at a server that hosts the workspace, with an attribute indicating its hierarchical relationship to one or more of blocks of the plurality of blocks, and wherein at least part of the plurality of blocks includes one or more time properties;

presenting the plurality of blocks in a first graphical user interface in a first format indicating the hierarchical relationship between the plurality of blocks, wherein the hierarchical relationship is associated with the attribute indicating a parent task associated with the project and a sub-task associated with the project;

presenting, in a second graphical user interface, the at least part of the plurality of blocks according to the one or more time properties, wherein the second graphical user interface includes a second format indicating a calendar page of a user who participates in the project;

providing remote access to a user over a computer network so that the user can provide an input via the calendar page, wherein the input introduces a modification to content of a block in the at least part of the plurality of blocks; and automatically synchronizing the first graphical user interface and the second graphical user interface based on the input from the user by propagating the modified content of the block to the information associated with the project by:

storing the modification in a queue;

automatically generating a message including the modification to the content of the block;

transmitting the message to the first graphical user interface over the computer network, wherein the message includes the attribute indicating the hierarchical relationship between the block having modified content and the at least part of the plurality of blocks, so that the first graphical user interface has immediate access to the modification; and causing, in real time, the first graphical user interface to convert the modification from the second format including the calendar page of the user who participates in the project to the first format including the hierarchical relationship representing the parent task associated with the project and the sub-task associated with the project by using the attribute indicating the hierarchical relationship between the block having modified content and the at least part of the plurality of blocks in the first user interface; and causing the first graphical user interface to present the modification to the user.

2. The computer-implemented method of claim 1, comprising:

displaying, in a timeline page of the project, the at least part of the plurality of blocks according to the one or more time properties; and updating the timeline page of the project upon the content of the block being modified by the user.

3. The computer-implemented method of claim 2, comprising:

providing, on the timeline page of the project, a link to the calendar page of the user.

4. The computer-implemented method of claim 1, comprising:

sending a notification to other users who are associated with content of the block.

5. The computer-implemented method of claim 1, wherein the one or more time properties of the at least part of the plurality of blocks comprise a due date, and the computer-implemented method comprises:

displaying, in a first view of the calendar page, one or more blocks according to the due date.

6. The computer-implemented method of claim 1, wherein the one or more time properties of the at least part of the plurality of blocks comprise a planned execution time, and the computer-implemented method comprises:

displaying, in a second view of the calendar page, one or more blocks according to the planned execution time.

7. The computer-implemented method of claim 1, comprising:

displaying, together with the information associated with the project, user-specific information in the calendar page, wherein the user-specific information is retrieved from a calendar service;

receiving a second input from the user via the calendar page, wherein the second input modifies content of the user-specific information; and updating, via an Application Programming Interface (API) provided by the calendar service, the user-specific information based on the second input.

8. A computer-implemented method for integrating project information in a calendar page of a user in a workspace, the computer-implemented method comprising:

displaying user-specific information in the calendar page, wherein the user-specific information comprises at least one of an event, an appointment, or a task created by the user;

obtaining part of project information that is associated with the user, wherein the project information is represented as a plurality of blocks, wherein each of the plurality of blocks is embedded as an in-page object on a page of the workspace, wherein the plurality of blocks includes parent blocks and child blocks that have hierarchical relationships within the workspace, and wherein each of the plurality of blocks is stored, at a server that hosts the workspace, with an attribute indicating its hierarchical relationship to one or more of blocks of the plurality of blocks;

presenting the plurality of blocks in a first graphical user interface in a first format indicating the hierarchical relationship between the plurality of blocks, wherein the hierarchical relationship is associated with the attribute indicating a parent task associated with the project and a sub-task associated with the project;

presenting, in a second graphical user interface in a second format including the calendar page of the user, the part of the project information together with the user-specific information according to a user selection of a specific view, wherein the specific view comprises at least one of:

(1) a due-date view in which a first part of the plurality of blocks that comprises a due-date property is displayed in the calendar page; or (2) a planned execution view in which a second part of the plurality of blocks that comprises a planned execution property is displayed in the calendar page;

providing remote access to a user over a computer network so that the user can provide an input via the second format indicating the calendar page, wherein the input introduces a modification to content of a block in the at least part of the plurality of blocks;

automatically synchronizing the first graphical user interface and the second graphical user interface based on the input from the user by:

storing the modification in a queue;

automatically generating a message including the modification to the content of the block;

transmitting the message to the first graphical user interface over the computer network, wherein the message includes the attribute indicating the hierarchical relationship between the block having modified content and the at least part of the plurality of blocks, so that the first graphical user interface has immediate access to the modification; and causing, in real time, the first graphical user interface to convert the modification from the second format including the calendar page of the user who participates in the project to the first format including the hierarchical relationship representing the parent task associated with the project and the sub-task associated with the project by using the attribute indicating the hierarchical relationship between the block having modified content and the at least part of the plurality of blocks in the first user interface; and causing the first graphical user interface to present the modification to the user.

9. The computer-implemented method of claim 8, comprising:

providing a timeline view of the project information displayed according to one or more time properties of the project information, wherein a link to the calendar page of the user is provided as part of the timeline view of the project information.

10. The computer-implemented method of claim 8, comprising:

automatically updating the plurality of blocks representing the project information on the page of a workspace upon a change made by the user on the calendar page.

11. The computer-implemented method of claim 10, further comprising:

sending a notification of the change to other users who are associated with the part of the project information.

12. The computer-implemented method of claim 8, comprising:

automatically updating the calendar page upon detecting a change made to the part of the project information.

13. The computer-implemented method of claim 8, wherein the project information comprises a block that spans across multiple days, and wherein the block is displayed above the user-specific information in the calendar page.

14. The computer-implemented method of claim 8, wherein the project information comprises a block that occupies a number of hours on a single day, and wherein the block is displayed together with corresponding user-specific information on the day.

15. A non-transitory, computer-readable storage medium comprising instructions recorded thereon, wherein the instructions, when executed by at least one data processor of a system, cause the system to perform operations for suggesting prompts on a page of a workspace, the operations comprising:

obtaining information associated with a project, wherein the information is represented as a plurality of blocks, wherein each of the plurality of blocks is embedded as an in-page object on a page of the workspace, wherein the plurality of blocks includes parent blocks and child blocks that have hierarchical relationships within the workspace, wherein each of the plurality of blocks is stored, at a server that hosts the workspace, with an attribute indicating its hierarchical relationship to one or more of blocks of the plurality of blocks, and wherein at least part of the plurality of blocks includes one or more time properties;

presenting the plurality of blocks in a first graphical user interface in a first format indicating the hierarchical relationship between the plurality of blocks, wherein the hierarchical relationship is associated with the attribute indicating a parent task associated with the project and a sub-task associated with the project;

presenting, in a second graphical user interface, the at least part of the plurality of blocks according to the one or more time properties, wherein the second graphical user interface includes a second format indicating a calendar page of a user who participates in the project;

providing remote access to a user over a computer network so that the user can provide an input via the second format indicating the calendar page, wherein the input introduces a modification to content of a block in the at least part of the plurality of blocks;

storing the modification in a queue;

automatically generating a message including the modification to the content of the block;

transmitting the message to the first graphical user interface over the computer network, wherein the message includes the attribute indicating the hierarchical relationship between the block having modified content and the at least part of the plurality of blocks, so that the first graphical user interface has immediate access to the modification; and causing, in real time, the first graphical user interface to convert the modification from the second format including the calendar page of the user who participates in the project to the first format including the hierarchical relationship representing the parent task associated with the project and the sub-task associated with the project by using the attribute indicating the hierarchical relationship between the block having modified content and the at least part of the plurality of blocks in the first user interface; and causing the first graphical user interface to present the modification to the user.

16. The non-transitory, computer-readable storage medium of claim 15, wherein the operations comprise:

receiving an input from the user, via the calendar page, wherein the input modifies content of a block in the at least part of the plurality of blocks; and automatically synchronizing the modified content of the block to the information associated with the project.

17. The non-transitory, computer-readable storage medium of claim 15, wherein the operations comprise:

automatically synchronizing the calendar page upon a change to the information of the project.

18. The non-transitory, computer-readable storage medium of claim 15, wherein the operations comprise:

displaying, in a timeline page of the project, the at least part of the plurality of blocks according to the one or more time properties; and updating the timeline page of the project upon content of a block being modified by the user.

19. The non-transitory, computer-readable storage medium of claim 15, wherein the one or more time properties of the at least part of the plurality of blocks comprise a due date, and wherein the operations comprise:

displaying, in a first view of the calendar page, one or more blocks according to the due date.

20. The non-transitory, computer-readable storage medium of claim 15, wherein the one or more time properties of the at least part of the plurality of blocks comprise a planned execution time, and wherein the operations comprise:

displaying, in a second view of the calendar page, one or more blocks according to the planned execution time.

* * * * *